United States Patent
Chiu et al.

(10) Patent No.: US 6,239,801 B1
(45) Date of Patent: *May 29, 2001

(54) METHOD AND SYSTEM FOR INDEXING AND CONTROLLING THE PLAYBACK OF MULTIMEDIA DOCUMENTS

(75) Inventors: Patrick Chiu, Menlo Park; Thomas P. Moran, Palo Alto; William J. Van Melle, Los Altos; Steven R. Harrison, Portola Valley; Polle T. Zellweger, Palo Alto, all of CA (US)

(73) Assignee: Xerox Corporation, Stamford, CT (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/397,665

(22) Filed: Sep. 16, 1999

Related U.S. Application Data

(62) Division of application No. 08/959,527, filed on Oct. 28, 1997, now Pat. No. 5,986,655.

(51) Int. Cl.[7] ........................................................ G06F 3/14
(52) U.S. Cl. .......................... 345/349; 345/302; 345/328; 345/348; 707/901
(58) Field of Search .................................... 345/349, 302, 345/348, 358, 328, 327, 341, 974; 707/901, 513

(56) References Cited

U.S. PATENT DOCUMENTS

| 5,519,828 | * | 5/1996 | Rayner ................................. 345/326 |
| 5,634,100 | * | 5/1997 | Capps et al. ............................ 705/9 |
| 5,659,790 | * | 8/1997 | Kim et al. ............................. 345/302 |
| 5,680,639 | * | 10/1997 | Milne et al. .......................... 345/302 |
| 5,745,116 | * | 4/1998 | Pisutha-Arnond ................... 345/358 |
| 5,781,188 | * | 7/1998 | Amiot et al. ......................... 345/328 |
| 5,786,814 | * | 7/1998 | Moran et al. ........................ 345/328 |

OTHER PUBLICATIONS

Evolutionary Engagement in an Ongoing Collaborative Work Process: A Case Study, Thomas P. Moran et al., pp. 150–159, Computer Supported Cooperative Work '96, 1996 ACM.

A Confederation of Tools for Capturing and Accessing Collaborative Activity—Scott Minneman et al., pp. 523–534, Multimedia '95, 1995 ACM.

\* cited by examiner

Primary Examiner—Raymond J. Bayerl
Assistant Examiner—Cuong T. Thai
(74) Attorney, Agent, or Firm—Oliff & Berridge, PLC

(57) ABSTRACT

An electronic multimedia document system provides temporal icons that provide indices into a recording of a meeting or presentation. The temporal icons index the times of occurrence of events and beginning times, ending times, and time spans of timestreams. The temporal icons provide complete playback control of the document through a gestural interface.

10 Claims, 8 Drawing Sheets

METHOD AND SYSTEM FOR INDEXING AND CONTROLLING THE PLAYBACK OF MULTIMEDIA DOCUMENTS

This is a Division of application Ser. No. 08/959,527 filed Oct. 28, 1997 now U.S. Pat. No. 5,986,655. The entire disclosure of the prior application is hereby incorporated by reference herein in its entirety.

BACKGROUND OF THE INVENTION

1. Field of Invention

This invention relates to electronic multimedia document systems. In particular, this invention is a method and a system for providing an historical index to a multimedia document using temporal icons. More specifically, this invention provides temporal icons that present temporal information about corresponding events or timestreams and also provides complete playback control through a gestural interface on the temporal icons.

2. Description of the Related Art

The collection of audio, video, and other records of a meeting provides a rich, reviewable record of the history of a meeting or a presentation. Unfortunately, the benefits of such a record is often outweighed by the unwieldiness of sequential access. The advent of digital recordings has provided the ability to instantly access any portion of a recording. However, instant access is only valuable to the user if the user knows which portion of the recording to access and how to gain access those portions.

A user of a multimedia document system will typically want to playback the recording of a meeting to recall conversations and/or other activities that occurred during the meeting. Such a user may include one of those who were present during the meeting or may be one who did not attend the meeting.

One conventional approach to indexing a multimedia document is termed real-time note taking. Real-time note taking describes a technique whereby a person takes notes during a meeting using a system that time stamps the various individual elements of the notes. A real-time note taking system provides a comprehensible index into the recording of the meeting. A user can retrieve and play a part of the recording simply by selecting a corresponding element of the notes.

The simplest example of a real-time note taking system is a text transcription system. The user of a text transcription system simply types the text as the meeting proceeds. The text can be a literal transcription of what is being said or can be arbitrary notes about the meeting. The notes include a string of text, and the time stamped note elements are the individual characters of the text. The notes can also be "strokes", "ink", "digital ink" or "marks" input by a pen based input device. Each stroke of the pen on the display generates a corresponding digital ink mark. The digital ink marks are time-stamped and each mark serves as an index element. After the note taking is complete, the user can select a character or element and the corresponding part of the meeting record will be retrieved and played.

Conventional note taking systems allow users to construct a visual representation of indices into the meeting recording. The visible representation in this case are the notes. Each index element has a time associated with it, which is the time when the element was created. Since each index element is visible, the user selects a character by simply pointing to it. Because the character has an associated time, the user obtains access to the corresponding point in the meeting recording.

Real-time note taking systems work as long as the visual representation is formed by a sequence of element-creating events. However, problems arise when the representation is edited during the course of a meeting. For example, a user may delete and/or change events. However, a deletion removes the element and the associated time stamp. When a new element is substituted for the deleted element, the time stamp of the new element reflects the time that the new element was added, rather than the time of the original element. Therefore, the corresponding time of the underlying event is lost. This occurs because the indices are the visible elements and not the underlying events in the meeting.

Another disadvantage of the conventional real-time note taking system is that a person must be devoted to the note-taking task. It is desirable to create an index into the meeting recording without dedicating a person to the task of note taking. The indexing should be a byproduct of the meeting or activity.

Historical data is captured by multimedia document systems using one or more capture devices, such as an audio recorder or an electronic whiteboard. These recordings typically have timestreams and events. Timestreams are sets of time-stamped continuous data streams which represent some recordable aspect of a meeting. Typical timestreams include, for example, audio and video signals, and/or a history of the inputs on an electronic whiteboard. Events are occurrences within a timestream. For example, an event may be a particularly significant action taken on the electronic whiteboard, such as an input of typed or handwritten notes, page changes, highlighted items, etc., or may be a change in a speaker during the session. Events can be used to create indices which provide direct access to a point in time during a meeting. Timestreams may inherently define events, or alternatively, may be analyzed to identify events. Event information includes a time stamp, an event type and a list of various properties of the instance of the event. Indices into the timestream can be created by a post-session analysis such as by, for example, a speaker identification system analysis on an audio stream.

Documents recorded by multimedia document systems, include, handwriting on an electronic whiteboard, typed or handwritten notes, annotated materials, etc. These documents may have been produced and recorded during a meeting. However, the documents may not have been presented during the meeting but may have been generated by a post-session analysis and recorded as an integral part of the meeting recording.

When reviewing the recording, conventional multimedia document systems provide both the documents and the indices to a user. Typically, a user will read the documents and selectively replay some of the recorded materials. The user may read the documents to understand the content of the meeting and refer to the indices to understand the chronological sequence of events of the meeting.

A problem for user interface design in multimedia document systems is the presentation of the indices to a user. Conventionally, there are two different approaches. The first approach represents the events on a timeline. For example, some systems use colored segments of a timeline to show the speaker during different points in time. However, the user of such a system is required to manage and coordinate at least two different representations. The first representation is the timeline of the events and the second is the display of the documents.

The second approach to user interface representation of indices implicitly represents the indices of the documents in a manner similar to the real-time note taking systems. For example, each stroke drawn on an electronic whiteboard may be time-stamped during the meeting. The time-stamping makes each stroke an index into the recording. However, significant strokes cannot be distinguished from insignificant strokes. Therefore, a user is forced to adopt other methods or systems to keep track of the significant strokes, such as by using, for example, bullets or stars. However, these indices cannot be edited and the history of the recording is not displayed to the user.

Furthermore, multiple times are often associated with a document element, such as the time an element was created, and the time it was last edited. There is no conventional method or system for associating multiple times with index elements.

One multimedia document system uses a clock icon as a temporal icon and index into a recording. Each clock icon indicates a single point in time. Tapping on a clock icon causes the document to start play back at the time indicated on the clock icon. However, these clock icons only indicate a single point in time. In particular, they do not indicate spans of time. Therefore, a user cannot determine how long a specific topic was addressed during a meeting. A user of this multimedia document system only knows at what point in time the discussion of an issue may have been initiated.

Additionally, these clock icons do not indicate the portions of the recording which have been reviewed and those portions which have not been reviewed. Therefore, a user might replay portions of a document that have already been reviewed when the user is intending to review only previously unreviewed portions of the recording. The conventional clock icon indicates the point in time where a discussion of an issue was initiated. However, it does not indicate the progress of the review through the span of time in which the issue was discussed. Therefore, a user is forced to speculate on the progress of a review through a portion of the document.

The conventional clock icons also do not provide any control over playback, other than the ability to initiate the playback at the point in time associated with the clock icon. A user is required to access a separate graphical user interface (hereafter GUI) that resembles a conventional tape deck or VCR control panel.

SUMMARY OF THE INVENTION

This invention provides a system and a method that use temporal icons to index and control playback of a multimedia document. This invention further provides temporal icons that indicate the point in time of an event and the time span of a timestream. This invention also provides temporal icons that indicate the state of the playback of the associated events and timestreams.

This invention additionally provides a method and a system that enable gestural control of playback functions.

One embodiment of the method and system of this invention uses analog clock icons as the temporal icons. An analog clock icon indicates an indexed point of time using its hands and a span of time using an arc on its bezel. The analog clock icons also indicate their states using colors and shades of the face of the analog clock icons. The analog clock icons can be created automatically or manually using controls on the display. Gestures made on the clock icons provide complete playback control of the document.

These and other features and advantages of this invention are described in or are apparent from the following detailed description of the preferred embodiments.

BRIEF DESCRIPTION OF THE DRAWINGS

The preferred embodiments of this invention will be described in detail, with reference to the following figures, wherein.

DETAILED DESCRIPTION OF PREFERRED EMBODIMENTS

This invention provides an index for the replay of records of collaborative activities, such as meetings, and other non-collaborative events such as a presentation. While the invention is described in the setting of a meeting, the method and system of this invention is not limited to such activities. Non-collaborative activities include presentations, speeches, training sessions and the like.

Meetings among groups of people are held for various reasons, such as, for example, brainstorming, project review, etc. Often, a participant, or some other designated person, will take minutes of the meeting to report the results of the meeting. The creation of such minutes typically require that written notes be maintained. However, such written notes of the meeting may be incomplete, and taking the written notes may interfere with the meeting. Other meeting artifacts, such as, for example, diagrams or lists, are also created through use of some shared representation medium, such as an electronic whiteboard. In any event, reviewing such, notes and/or artifacts is often desirable when preparing the meeting minutes.

Another aid in creating meeting minutes is an audio or video recording. Unfortunately, these recordings are purely sequential. Thus, it is often very difficult to efficiently retrieve information from such recordings.

The system and method of this invention create indices into a meeting recording of a collaborative activity using the natural byproducts of the activity. The system and method of this invention provide an intuitive way for people to gain direct access to portions of the recorded session. Events such as a change of speaker, writing on, or merely putting markings on, an electronic whiteboard, and taking a note are examples of such natural byproducts of a meeting that provide useful index points.

Figure 1:
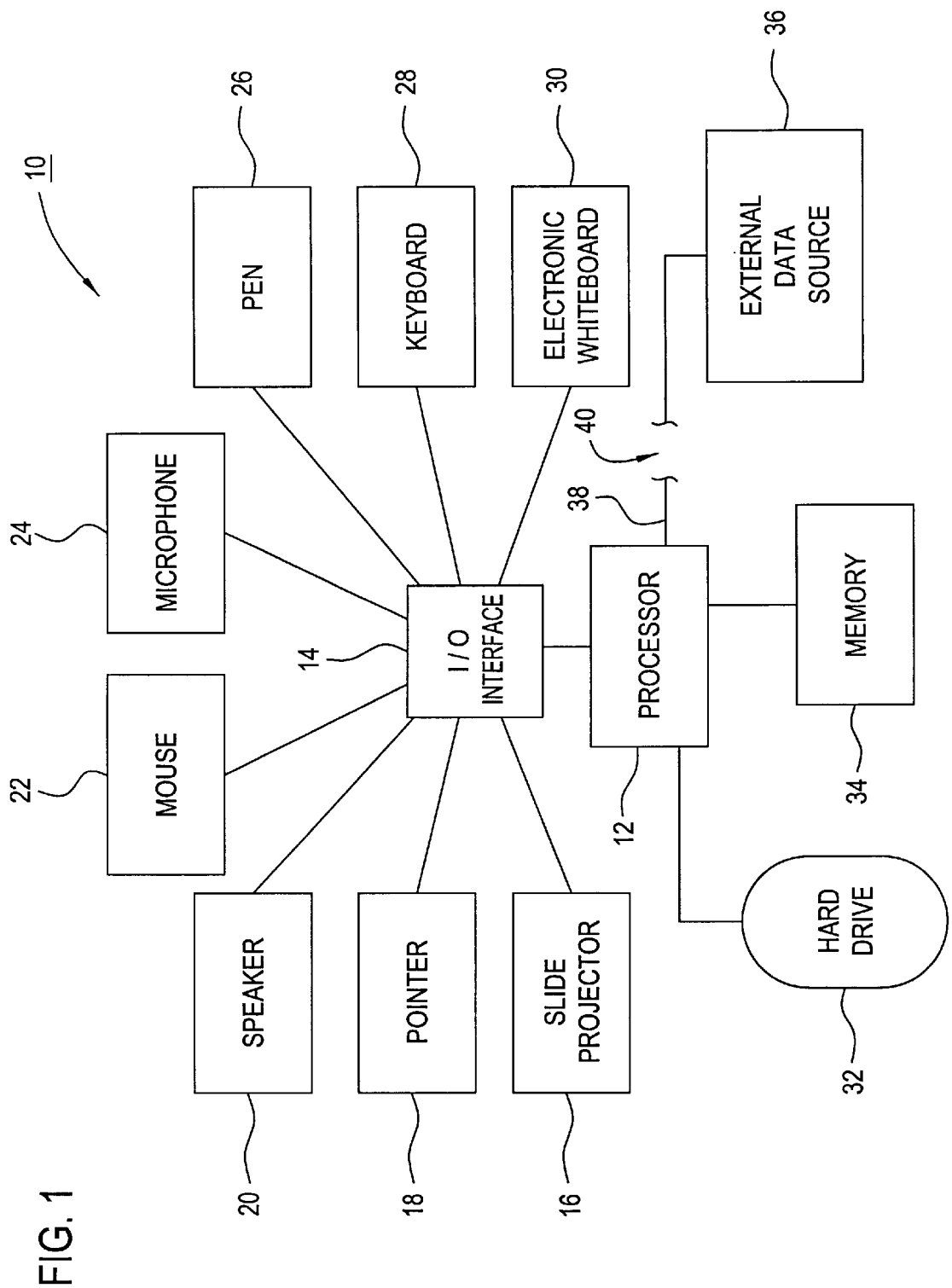
FIG. 1 is a block diagram of one embodiment of the system of this invention.

FIG. 1 is a block diagram of one embodiment of the electronic multimedia document system 10 of this invention. The electronic multimedia document system 10 has a processor 12 communicating with an input/output interface 14. The input/output interface 14 communicates with any number of conventional input/output devices, such as a slide projector 16, a pointer 18, a loudspeaker 20, a mouse 22, a microphone 24, a pen 26, a keyboard 28, and an electronic whiteboard 30. The input/output devices 16–30 provide an interface to input and output data and to input control signals from a user of the electronic multimedia document system 10.

The processor 12 also communicates with any number of local storage devices such as a hard drive 32 and a memory device 34. The processor 12 may also communicate with an external data source 36 across a communication line 38 that may have an interruptible connection 40.

Figure 2:
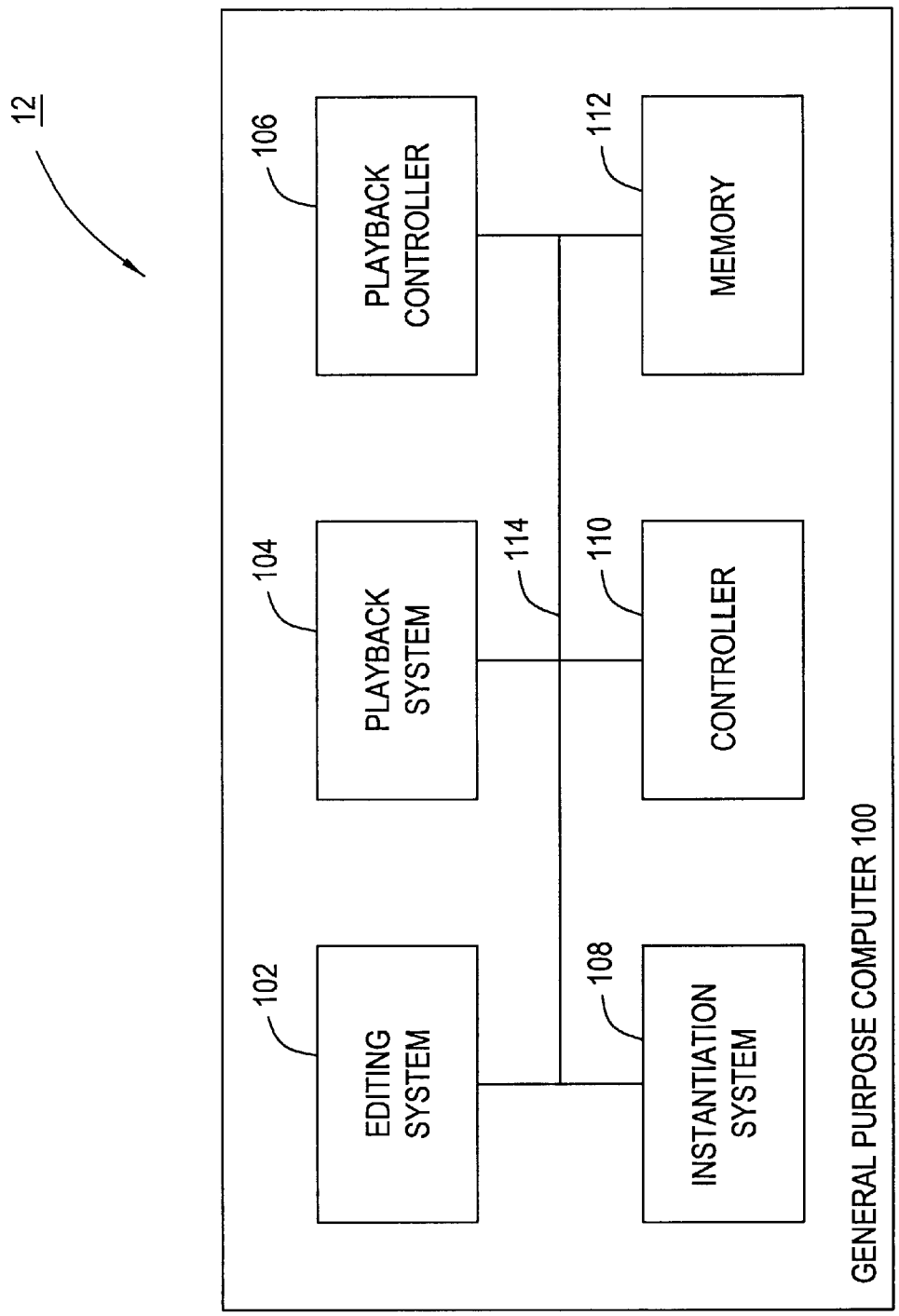
FIG. 2 is a block diagram of one embodiment of the processor of FIG. 7.

FIG. 2 is a block diagram showing one embodiment of the processor 12 in greater detail. The processor 12 is preferably implemented using a general purpose computer 100. The general purpose computer 100 preferably includes an editing system 102, a playback system 104, a playback controller 106, an instantiation system 108, a controller 110 and a memory 112. The elements of the general purpose computer 100 are interconnected by a bus 114. The editing system 102, the playback system 104, the playback controller 106 and the instantiation system 108 controlled by the controller 110, are used to implement the flowchart shown in FIGS. 7A–7D, described below. It should be appreciated that the editing system 102, the playback system 104, the playback controller 106 and the instantiation system 108 are preferably implemented as software routines running on the controller 110 and stored in the memory 112. It should also be appreciated that many other implementations of these elements will be apparent to those skilled in the art.

As shown in FIG. 2, the system 10 is preferably implemented using a programmed general purpose computer. However, the system 10 can also be implemented using a special purpose computer, a programmed microprocessor or microcontroller and any necessary peripheral integrated circuit elements, an ASIC or other integrated circuit, a hardwired electronic or logic circuit such as a discrete element circuit, a programmable logic device such as a PLD, PLA, FPGA or PAL, or the like. In general, any device on which a finite state machine capable of implementing the flowchart shown in FIGS. 7A–7D can be used to implement the processor 12.

Additionally, as shown in FIGS. 1 and 2, the memory device 34 and 112 are preferably implemented using static or dynamic RAM. However, the memories 34 and 112, and the hard disk 32, can also be implemented using a floppy disk and disk drive, a writable optical disk and disk drive, a hard drive, flash memory or the like. Additionally, it should be appreciated that the memories 32, 34 and 112, in various combinations, can be either distinct portions of a single memory or physically distinct memories.

Furthermore, it should be appreciated that the communication line 38 can be a wired or wireless link to a network. The network 36 can be a local area network, a wide area network, the Internet or any other distributed processing and storage network.

The input/output devices 16–30 preferably capture the timestream in a digital format. The timestream is desirably stored in a digital format to facilitate direct and random access to the various parts of the timestream. However, capturing and storing the timestream data in an analog format is also within the scope of this invention. In general, the format of the timestream need only correspond to the input/output device that was used to create the timestream. For example, an audio timestream is formed by a set of audio samples taken at some regular interval. In contrast, an electronic whiteboard creates a timestream that is a history file of time stamped primitive operations.

An important aspect in operating an electronic whiteboard are "gestures". In general, most interactions on the electronic whiteboard are "ink strokes" that create marks or "ink" displays on the electronic whiteboard. Thus, "ink strokes" are analogous to marking a regular whiteboard with an ink marker. A "gesture" is an interaction with the electronic whiteboard that is created like any other "ink stroke". However, a "gesture" differs from a regular "ink stroke" in that it is interpreted as a command to the electronic whiteboard rather than a mark on the electronic whiteboard. For example, if a particular "object" formed by one or more "ink strokes" is to be deleted from the display on the electronic whiteboard, the "object" is first selected by an encircling gesture with the pen. The encircling gesture is then finished with a "delete" gesture, such as a "pigtail". After being "deleted", the object encircled by the "delete" gesture no longer appears on the display of the electronic whiteboard.

When analyzing a timestream captured by an electronic whiteboard, an "event" of the timestream drawing a figure, writing a word, can include changing a page, erasing figures or words, making notations relative to existing marks, or entering a particular command to the electronic whiteboard interface.

Figure 3:
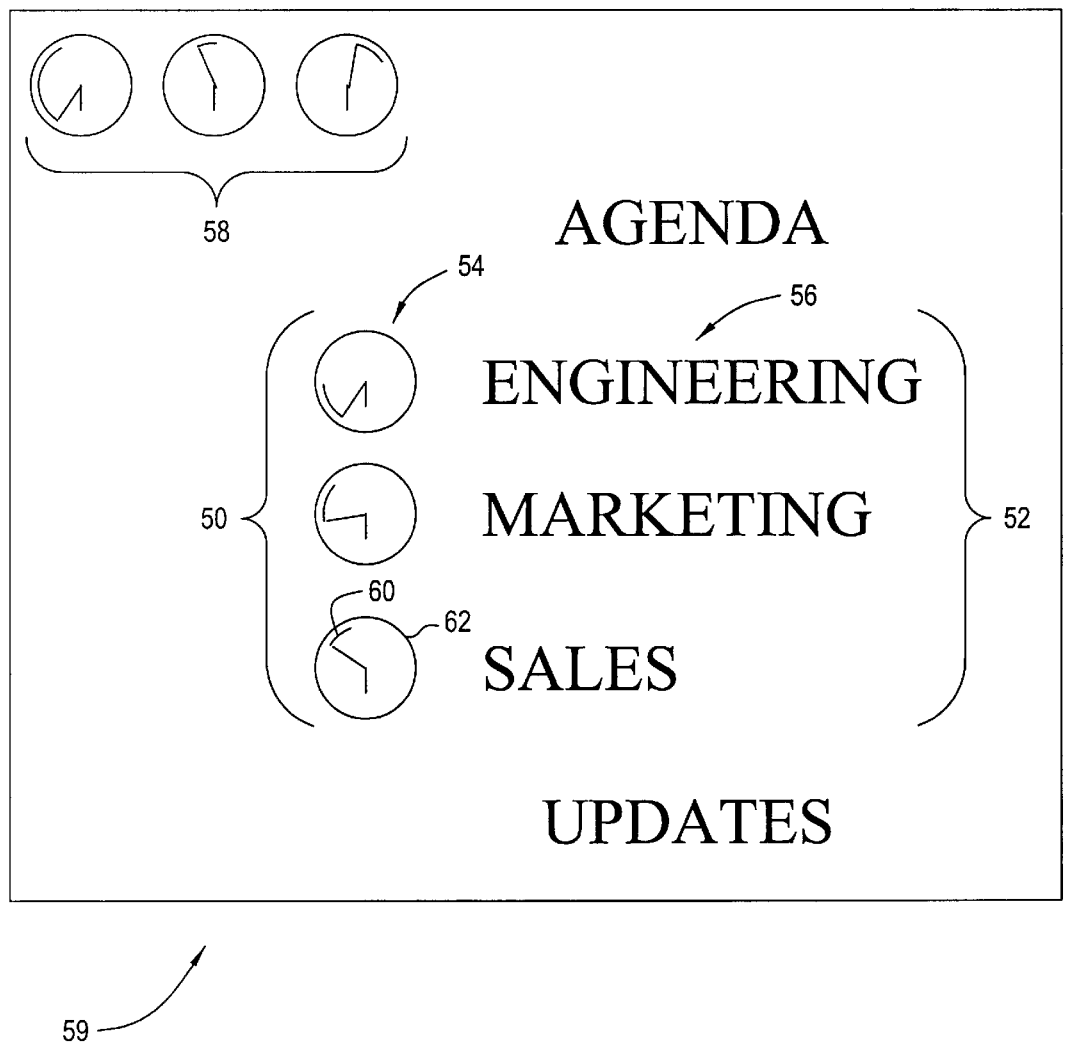
FIG. 3 shows an example of a presentation slide with analog clock icons as the temporal icons in accordance with one embodiment of the method and system of this invention.

FIG. 3 shows an example of a presentation slide 59 having clock icons 50 that indicate when each point 52 on the presentation slide 59 was discussed. The system and method of this invention create indices using temporal icons such as the clock icons 50. The temporal icons are embedded within the context of the multimedia document being indexed. The temporal icons are used throughout a multimedia document to show how the multimedia document proceeds through time.

Each temporal icon indicates both a point in time and a span of time. Therefore, the temporal icons reveal to the user how the document was created and used over a period of time. The user can access this information merely by glancing at the temporal icons in the multimedia document.

Each temporal icon acquires its attributes from its association with corresponding elements of the multimedia document. This association can be represented by the spatial relationships of the temporal icons to the other elements on a display of the multimedia document. Thus, the significance of the attributes of a temporal icon positioned near a note on the display is explained by the contents of the note. As shown in FIG. 3, the temporal icon 54 positioned near the point 52 labeled "ENGINEERING" 56 in the presentation slide 59 indicates when and how long the point 52 labeled "ENGINEERING" 56 was discussed. The temporal icons 58 positioned at the top of the slide indicate when and how long the slide 59 of the presentation was displayed during the meeting. More than one temporal icon 58 at the top of the slide 59 indicates that the slide 59 was displayed more than once during a meeting.

The temporal icons 50 and 58 can be created by a user by gesturing on an electronic whiteboard or by hitting a special key on a keyboard. The temporal icons 50 and 58 can also be created automatically by the system 10. For example, the system 10 can put a new temporal icon 58 at the top of the slide 59 every time that slide 59 is displayed during a meeting.

The temporal icons 50 and 58 can be edited to redefine their time attributes, so that they become more accurate indices. For example, additional temporal icons 50 and 58 can be added to a document during replay to add additional indices to the document. In this case, a temporal icon 50 or 58 acquires its time attributes from the playback time of the recorded session, rather than the time that the session was recorded. For example, during a meeting, if an issue is raised and discussed, a user of the electronic whiteboard can create an index to the discussion of that issue by creating a clock icon 50 and writing a note. However, in this example, the clock is usually created after the discussion of the issue began. Therefore, the clock can be edited to adjust its time backwards to more accurately index the start of the discussion. This editing can take place during the meeting, or can occur during a later access session.

During an access session, the meeting is conveniently displayed from the current clock setting, to determine if the setting is accurate. For the user's convenience, the replay starts automatically after an edit is performed. Therefore, the user gets immediate feedback on the appropriateness of the time setting.

One embodiment of the clock icon represents and displays several time attributes for each document element. The clock icon indicates an element's time span, including its beginning and ending times, its creation state, its play state, and its play progress state.

One embodiment of the clock icon 50 indicates the starting time using analog clock hands. The clock icon 50 indicates the time span using an arc 60 positioned along the clock face's outer bezel 62. The clock icon indicates its state using various colors, shades and stripes.

As shown in FIG. 3, in one embodiment, a span of time is represented on the clock icon 50 using arcs 60 on the bezels 62. Each arc 60 begins at the minute hand of the clock and sweeps out the length of time of the corresponding timestream. The span can be edited by double tapping on the clock icon 50 during recording or playback. A double tap displays a graphical user interface that enables editing of the time attributes of the clock icon 50. The user also does not have to specify an end point for each clock icon 50. Rather, when the user creates a new clock icon 50, the end time of the previous clock icon 50 is set.

Gestures on the temporal icons 50 can also be used to control playing back a multimedia document. The temporal icons provide full access and control of the temporal elements of the meeting. No other devices, such as a VCR-type control panel or timeline, are needed. The user can focus directly on the temporal icons to control access to both the content and the temporal process. A document with temporal icons can also easily be combined with a timeline in a document.

The clock icons 50 and 58 can be created both by the user and by the system. As explained above, a clock icon 58 is generated by the system automatically each time the displayed slide 59 changes. Each clock icon 58 indicates both when and how long the slide 59 was viewed. These clock icons 58 are placed in a row at the top of the slide, as shown in FIG. 3.

A user creates a clock icon 50 or 58 using a "circle" gesture. The location of the "circle" gesture on the electronic whiteboard, for example, indicates the placement of the clock icon. The current time (i.e., the time of creation) is shown by using the clock hands. When the clock icon 50 or 58 is created during a playback mode, the clock icon 50 or 58 indicates the current playback time.

A remote device, such as a pen on a remotely-operated electronic whiteboard or a laser pointer, can be used to create the clock icons 50 and 58 during a presentation. To make creation easier and placement of the clock icons more precise, "primordial" clocks, i.e., clocks without time attributes, can be created in advance, during preparation of a document. These "primordial" clocks can be provided with time attributes, by tapping or gesturing on the primordial clock using the remote pointer during a meeting or a presentation.

Figure 4:
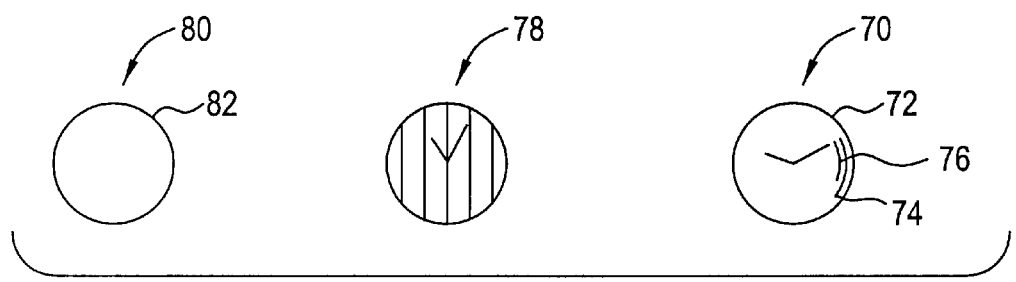
FIG. 4 shows the creation states of the temporal icons in accordance with one embodiment of the method and system of this invention.
Figure 5:
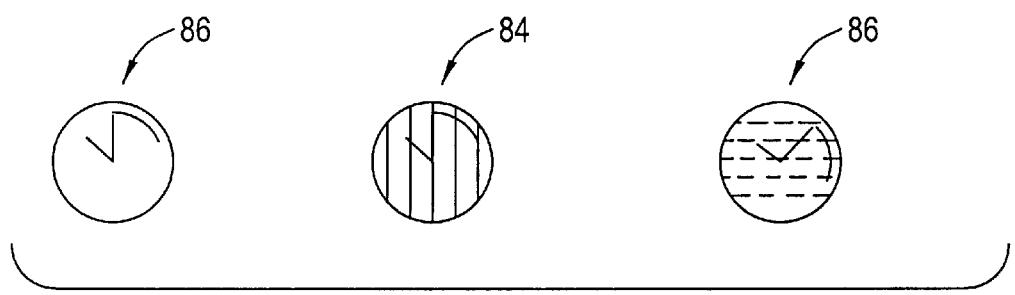
FIG. 5 shows the play states of the temporal icons in accordance with one embodiment the method and system of this invention.
Figure 6:
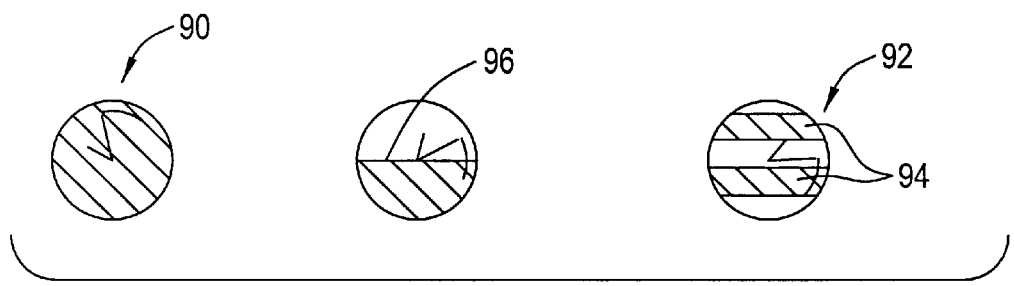
FIG. 6 shows the play progress states of the temporal icons in accordance with one embodiment of the method and system of this invention.

The clock icons 50 and 58 can take any of several states, as shown in FIGS. 4–6. These states include creation states, play states, and play progress states.

The creation states, shown in FIG. 4, indicate the stage of creating a clock icon. In the "normal" creation state 70, a clock icon has a time span arc 76 indicating a beginning time 72 and an ending time 74. The "live" creation state clock icon 78 initially has only a beginning time. The beginning time is indicated by the clock hands and initially does not have an ending time. The ending time is eventually set by the user or automatically by some event, such as a slide change. A live clock icon 78 has its face highlighted and does not have an arc on its bezel. A clock icon in the primordial creation state 80 has no time attributes associated with it, until it is instantiated during a meeting. A primordial clock icon 80 thus has a bezel 82 but does not have hands or time spans. Therefore, a primordial clock icon 80 generally resembles a bullet.

FIG. 5 shows several "play" states for the temporal icons 50 and 58. The play states indicate whether a clock icon is playable or not, and whether it is currently being played. The face of a clock icon 84 that is being played has a first color, the face of a clock icon 86 that is not being played, but is playable, has a second color. The face of clock icon 88 that is not playable has a third color. The clock icon 88 may not be playable because, for example, it has a time span that is out of the current range of the recording.

FIG. 6 shows several "play progress" states for the temporal icons 50 and 58. The play-progress state indicates which portions of a clock icon's time span has been played during a particular session. The clock face 90 has a fourth color to represent the portions of the timestream corresponding to the span of the clock icon 90 that have been played. Of course, there are other methods to display the play progress, such as a thermometer-like icon just below each clock.

Playing straight through the time span fills the face of the clock icon 90 from the bottom up. The play-progress state also contains the clock icon's current play point, which is marked by a horizontal line 96. Playing portions of the clock icon by skipping back and forth to other clock icons fills the clock face 92 with stripes 94. The relative vertical position of a stripe 94 indicates its relative temporal location in the total span. The bottom of the clock icon represents the beginning of the span of time and the top of the clock icon represents the end. In contrast to a timeline which has a single current play point, a document with a collection of clocks has multiple current play points.

Preferably, the first color is red, the second color is white, the third color is gray, and the fourth color is green, although any colors can be used. It should be understood that, while the above description described specific colors as indicating various clock icon states, the method and the system of this invention is not to be limited to these colors. One of ordinary skill in the art understands that there are many methods of indicating the state of the temporal icons of this invention and that any method or system is appropriate as long as the states are distinguishable from each other.

To control playback using the clock icons 50 and 58, the user gestures directly on the clock icon 50 or 58. A tap starts the playback from the clock icon's current play point, or instantiates a primordial clock icon. If a clock icon is currently playing, then a tap pauses the playback. If a clock icon is live, then a tap sets the end time. A double tap sets the ending point of a clock icon's time span to be the current time or the play time. A gesture to the left moves the clock icon's current play point back ten seconds. A gesture to the right moves the clock icon's current play point ahead ten seconds. An "upward" gesture moves the play point to the previous clock icon boundary. A "hold" gesture causes a graphical user interface (not shown) to be displayed, to enable editing the clock icon's time attributes.

FIGS. 7A–7D outline one preferred embodiment of the control routine of the method and system of this invention. The control routine starts at step S100 and continues to step S110. At step S110, the control routine determines if an "open document" command has been received. If, at step S110, the "open document" command has been received, control continues to step S120. Otherwise, control loops back to step S110.

At step S120, the control routine opens a document. Next, at step S130, the control routine determines if a "record" command has been received. If, at step S130, a "record" command has been received, control continues to step S140. Otherwise, control jumps to step S320, shown in FIG. 7C. At step S140, the control routine begins recording the events and timestreams of the collaborative session, meeting or presentation.

Then step S150, the control routine determines if an index point of a primordial clock icon has been encountered such as an event or timestream. If, at step S150, an index point of a primordial clock icon is encountered, control continues to step S160. Otherwise, control jumps directly to step S180. At step S160, the control routine determines if an event or timestream corresponding to the primordial clock icon has been encountered. If, at step S160, the control routine determines that an event or timestream corresponding to the primordial clock icon has been encountered, control continues to step S170. Otherwise, control again jumps directly to step S180. At step S170, the control routine instantiates the primordial clock icon by assigning the time attributes of the corresponding event or timestream to the clock icon. Control then continues to step S180.

At step S180, the control routine determines if a "circle" gesture has been made on the display of the clock icon. If, at step S180, a "circle" gesture is not made, control continues to step S190. Otherwise, control jumps to step S240, as shown in FIG. 7B.

At step S190 the control routine determines if a "stop recording" command has been received. If, at step S190, a "stop recording" command has been received, control continues to step S200. Otherwise, control jumps back to step S150. At step S200 the control routine stops recording the multimedia document. Next, at step S210, the control routine determines if a "close document" command has been received. If, at step S210, a "close document" command has been received, control continues to step S220. Otherwise, control jumps back to step S130. At step S220, the control routine closes the current document. Then in step S230, the control routine stops.

Figure 7A:
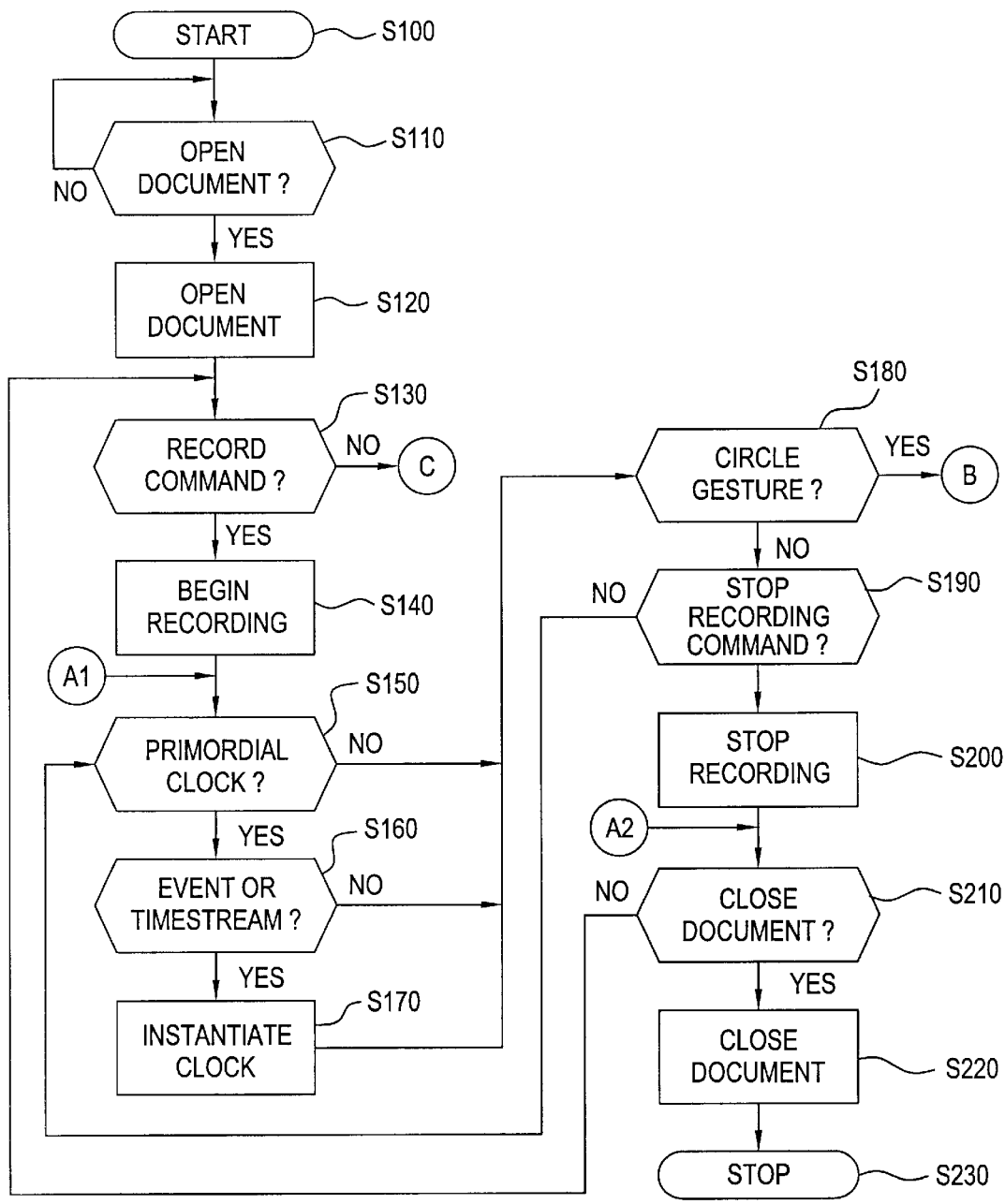
FIGS. 7A–7D is a flowchart outlining the operation of the control routine of one embodiment of the method and system of this invention.
Figure 7B:
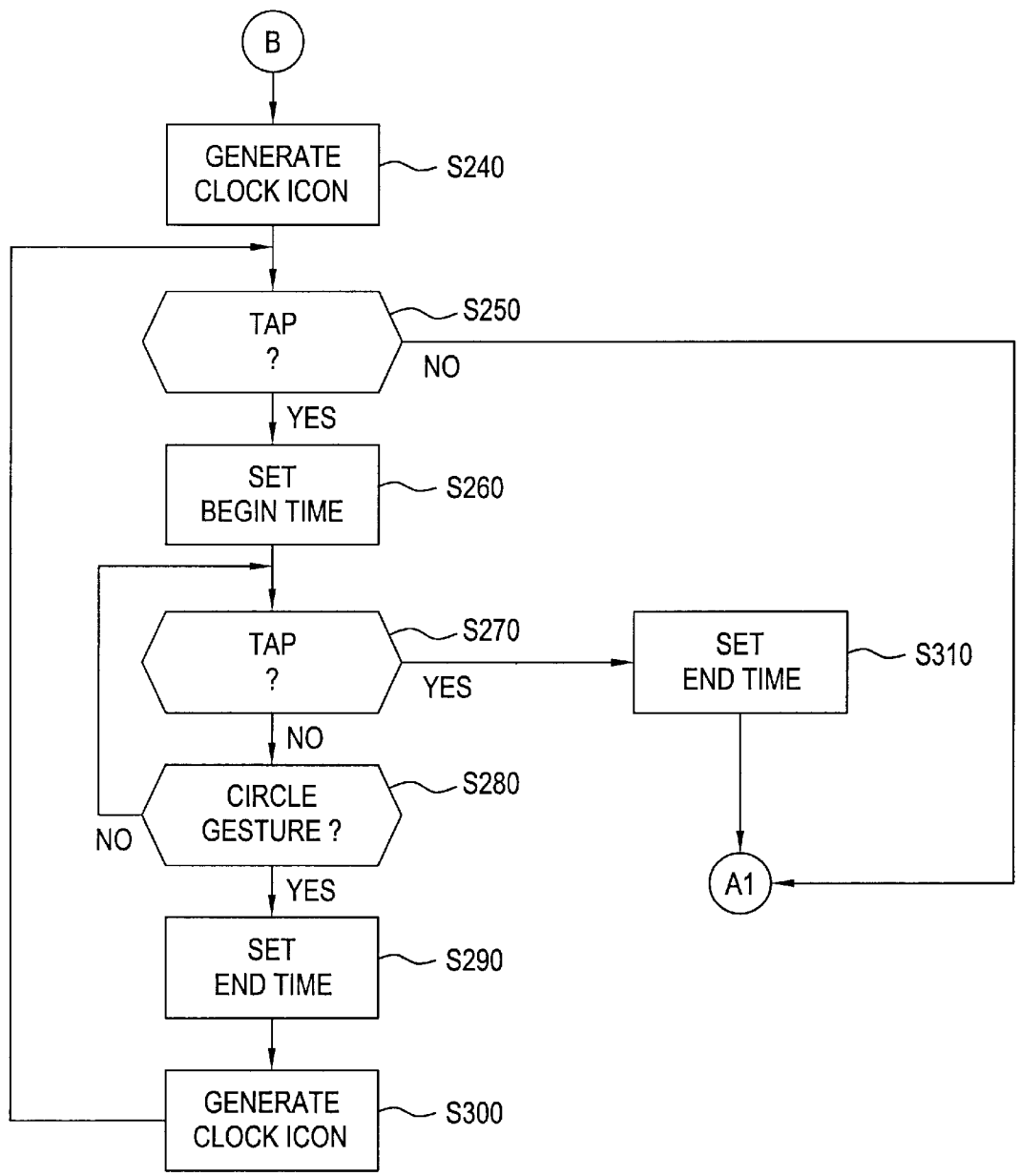
Figure 7C:
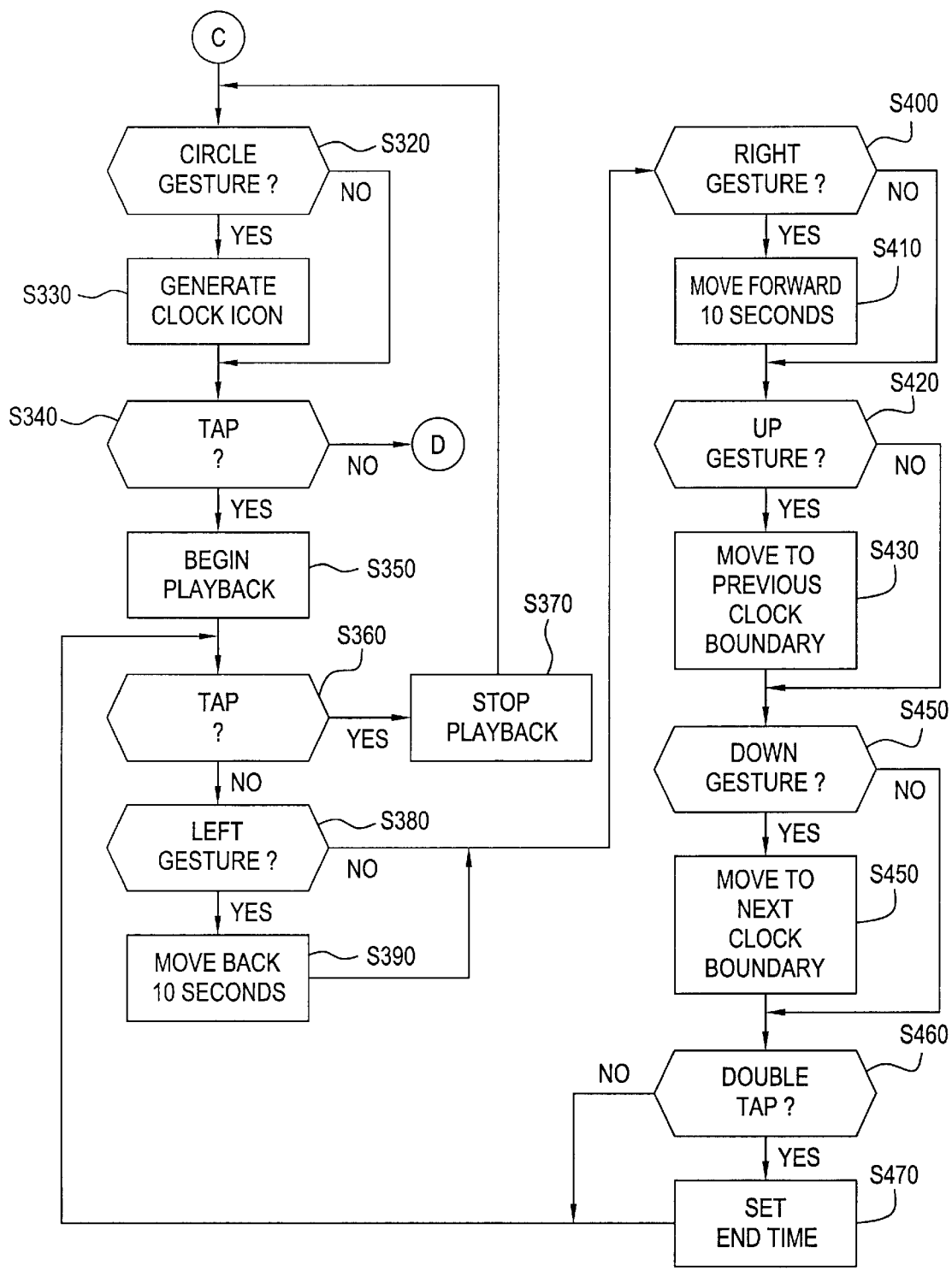

As shown in FIG. 7B, at step S240, the control routine generates and displays a clock icon. Then, at step S250, the control routine determines if a "tap" gesture has been made on the display of a clock icon. If, at step S250, the control routine determines that a "tap" gesture has been made on the display of the clock icon, control continues to step S260. Otherwise control returns to step S150 of FIG. 7A.

At step S260, the control routine sets the begin time of the clock icon to the current time. Next, at step S270, the control routine determines if a second tap gesture has been made on the display of a clock icon. If, at step S270, the control routine determines that a "tap" gesture has not been made on a display of a clock icon, control continues to step S280. Otherwise, control jumps to step S310. At step S280 the control routine determines if a "circle" gesture has been made on the display of the clock icon. If, at step S280, the control routine determines that a "circle" gesture has been made, control continues to step S290. Otherwise, control jumps back to step S290.

At step S290, the control routine sets the end time of the current clock icon to the current recording time. Next, at step S300, the control routine generates a new clock icon on the display at the position of the "circle" gesture. Control then returns to step S250.

At step S310, the control routine sets the end time of the clock icon to the current recording time. Control then returns to step S150 of FIG. 7A. As set forth above, if, at step S130 of FIG. 7A, the control routine determines that a "record" command has not been made, control jumps to step S320, shown in FIG. 7C. At step S320, the control routine determines if a "circle" gesture has been made on the display of the clock icon. If, at step S320, the control routine determines that a circle gesture has been made on the display of the clock icon, control continues to step S330. Otherwise, control jumps directly to step S340. At step S330, the control routine generates a clock icon at the position of the circle gesture. Control then continues to step S340.

Figure 7D:
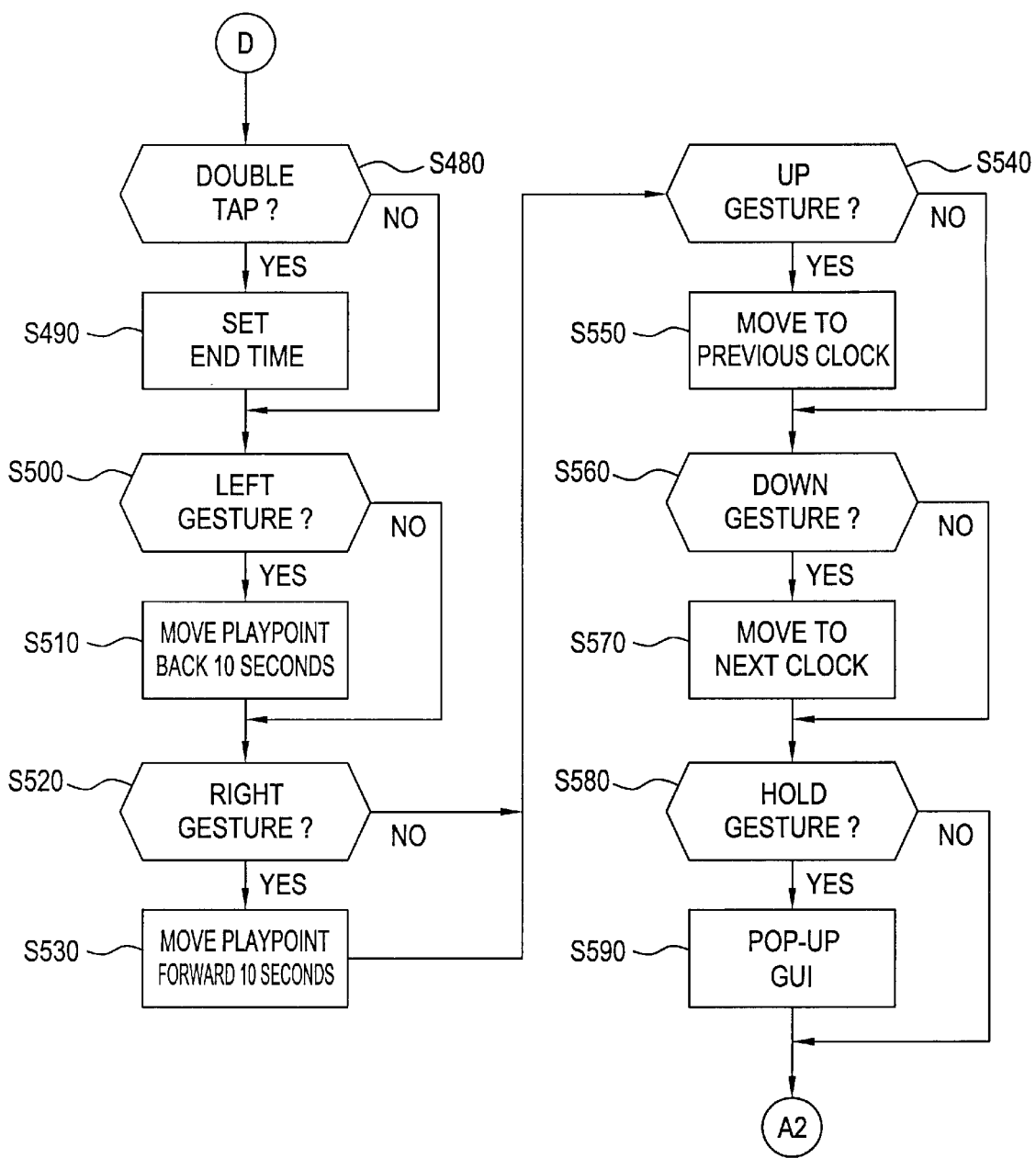

At step S340, the control routine determines if a "tap" gesture has been made on the display of the clock icon. If, at step S340, the control routine determines that a "tap" gesture has been made on the display of the clock icon, then the control routine continues to step S350. Otherwise, control jumps to step S480, as shown in FIG. 7D.

At step S350, the control routine begins playing back the open document. Next, at step S360, the control routine determines if a "tap" gesture has been made, on the display of the clock icon. If, at step S360, the control routine determines that a "tap" gesture has been made, control continues to step S370. Otherwise, control jumps to step S380.

At step S370, the control routine stops playing back the current document. Control then returns to step S320.

At step S380, the control routine determines if a "left" gesture has been made on the display of the clock icon. If, at step S490, the control routine determines that the "left" gesture has been made, control continues to step S390. Otherwise, control jumps directly to step S400. At step S390, the control routine moves back the current play point ten seconds. The control routine then continues to step S406.

At step S400, the control routine determines if a "right" gesture has been made on the display of the clock icon. If, at step S400, the control routine determines the "right" gesture has been made, control continues to step S410. Otherwise, control jumps directly to step S420. At step S410, the control routine sets the current play point forward ten seconds. The control routine then continues to step S420.

At step S420, the control routine determines if an "up" gesture has been made on the display of the clock icon. If, at step S420, the control routine determines that the "up" gesture has been made on the display of the clock icon, control continues to step S430. Otherwise, control jumps directly to step S440. At step S430, the control routine moves the current play point to the previous clock icon boundary. The control routine then continues to step S440.

At step S440, the control routine determines if a "down" gesture has been made on the display of the clock icon. If, at step S440, the control routine determines that the "down" gesture has been made, control continues to step S450. Otherwise, control jumps directly to step S460. At step S450 the control routine moves the current playpoint to the next clock icon boundary. The control routine then continues to step S460.

At step S460, the control routine determines if a "double tap" gesture has been made on the display of the clock icon.

If, at step S460, the control routine determines that a "double tap" gesture has been made, control continues to step S470. Otherwise, control jumps directly back to step S360. At step S470, the control routine sets the end time of the current clock icon to the current play time. The control routine then also returns to step S360.

As shown in FIG. 7D, if at step S340, the control routine determines that a "tap" gesture has not been made, control jumps to step S480. At step S480, the control routine determines if a "double tap" gesture has been made on the display of the clock icon. If, at step S350, a double tap has been made, control continues to step S490. Otherwise, control jumps directly to step S500. At step S490, the control routine sets the end time of the clock icon to the current time. Control then continues to step S500.

At step S500, the control routine determines if a "left" gesture has been made on the display of the clock icon. If, at step S500, the control routine determines that a "left" gesture has been made, control continues to step S510. Otherwise, control jumps directly to step S520. At step S510, the control routine moves the play point of the current clock icon back ten seconds. Control then continues to step S520.

At step S520, the control routine determines if a "right" gesture has been made on the display of the clock icon. If, at step S520, the control routine determines that a "right" gesture has been made, control continues to step S530. Otherwise, control jumps directly to step S540. At step S530, the control routine moves the play point of the current clock icon forward ten seconds. The control routine then continues to step S410.

At step S540, the control routine determines if an "up" gesture has been made on the display of the clock icon. If, at step S410, the control routine determines that an "up" gesture has been made, control continues to step S550. Otherwise, control jumps directly to step S560. At step S550, the control routine moves the current play point to a previous clock icon. The control routine then continues to step S430.

At step S560, the control routine determines if a "down" gesture has been made on the display of the clock icon. If, at step S430, the control routine determines that a "down" gesture has been made, control continues to step S570. Otherwise, control jumps directly to step S580. At step S570, the control routine moves the play point to the next clock icon. The control routine then continues to step S580.

At step S580, the control routine determines if a "hold" gesture has been made, on the display of the clock icon. If, at step S450, a "hold" gesture has been made, control continues to step S590. Otherwise, control jumps directly back to step S210. At step S590, the control routine displays a pop-up graphical user interface that allows the user to edit the time attributes of the clock icon. The control routine then also returns to step S210.

While this invention has been described in conjunction with the specific embodiments outlined above, it is evident that many alternatives, modifications, and variations are apparent to those skilled in the art. Accordingly, the preferred embodiments of the invention as set forth above are intended to be illustrative and not limiting. Various changes may be made without departing from the spirit and scope of the invention as defined in the following claims.

What is claimed is:

1. A method for indexing a multimedia document for subsequent presentation, wherein the multimedia document is to expected to have at least one of an event and timestream, the method comprising:

generating a primordial temporal icon that is associated with the expected at least one of the event and the timestream, the primordial temporal icon having at least one undefined temporal attribute; and embedding the primordial temporal icon in the multimedia document at a time prior to a beginning of the timestream, such that, in response to the expected at least one of an event and timestream occurring with respect to the multimedia document, at least one of the at least one undefined temporal attribute will be defined;

wherein the at least one of the event and the timestream is independent of, and occurs after and independently of, a creation time of the primordial temporal icon.

2. The method of claim 1, further comprising:

providing at least one of the event and the timestream that corresponds to the expected at least one event and timestream; and associating at least one time attribute corresponding to the at least one of the event and the timestream to the primordial temporal icon.

3. The method of claim 2, wherein associating at least one time attribute comprises associating a time of an event.

4. The method of claim 2, wherein associating at least one time attribute comprises associating a beginning time of a timestream.

5. The method of claim 2, wherein associating at least one time attribute comprises associating an ending time of a timestream.

6. The method of claim 2, wherein associating at least one time attribute comprises associating a length of time of a timestream.

7. The method of claim 1, wherein the primordial temporal icon comprises a representation of a clock without time attributes.

8. A system for indexing a multimedia document, the multimedia document expected to have at least one of an event and a timestream, the system comprising:

a primordial temporal icon generator that generates a primordial temporal icon corresponding to the expected at least one of the event and the timestream, and that embeds the primordial temporal icon in the multimedia document at a time prior to a beginning of the timestream, the primordial temporal icon having at least one undefined temporal attribute; and a display that displays the primordial temporal icon and a representation of the expected at least one of the event and the timestream, such that, in response to the expected at least one of an event and timestream occurring with respect to the multimedia document, at least one of the at least one undefined temporal attribute will be defined;

wherein the at least one of the event and the timestream is independent of, and occurs after and independently of, a creation time of the primordial temporal icon.

9. The system of claim 8, further comprising:

a presentation system that presents the multimedia document and that establishes at least one of an event and a timestream corresponding to the expected at least one of the event and the timestream; and an instantiation system that associates at least one time attribute of the at least one of the event and the timestream to the primordial temporal icon.

10. The system of claim 8, wherein the primordial temporal icon comprises a representation of a clock without time attributes.

* * * * *